(12) United States Patent
Lam et al.

(10) Patent No.: US 7,689,452 B2
(45) Date of Patent: Mar. 30, 2010

(54) SYSTEM AND METHOD FOR UTILIZING SOCIAL NETWORKS FOR COLLABORATIVE FILTERING

(76) Inventors: Chuck P. Lam, 905 Oakes St., Palo Alto, CA (US) 94303; Murad Goeksel, 4190 Byron St., Unit #d, Palo Alto, CA (US) 94306

( * ) Notice: Subject to any disclaimer, the term of this patent is extended or adjusted under 35 U.S.C. 154(b) by 1694 days.

(21) Appl. No.: 10/847,839

(22) Filed: May 17, 2004

(65) Prior Publication Data
US 2005/0256756 A1    Nov. 17, 2005

(51) Int. Cl.
*G06F 17/50* (2006.01)
(52) U.S. Cl. .................... 705/10; 705/27; 707/5
(58) Field of Classification Search ............... 702/189; 707/3, 5; 705/10, 26
See application file for complete search history.

(56) References Cited

U.S. PATENT DOCUMENTS

| | | | |
|---|---|---|---|
| 4,870,579 A | 9/1989 | Hey | |
| 4,996,642 A | 2/1991 | Hey | |
| 5,704,017 A | 12/1997 | Heckerman et al. | |
| 5,790,426 A * | 8/1998 | Robinson | 702/179 |
| 5,867,799 A * | 2/1999 | Lang et al. | 707/1 |
| 5,872,850 A * | 2/1999 | Klein et al. | 705/51 |
| 6,029,195 A * | 2/2000 | Herz | 725/116 |
| 6,041,311 A * | 3/2000 | Chislenko et al. | 705/27 |
| 6,108,493 A * | 8/2000 | Miller et al. | 709/219 |
| 6,138,128 A * | 10/2000 | Perkowitz et al. | 715/205 |
| 6,266,649 B1 * | 7/2001 | Linden et al. | 705/26 |
| 6,317,722 B1 * | 11/2001 | Jacobi et al. | 705/14.51 |
| 6,321,179 B1 * | 11/2001 | Glance et al. | 702/189 |
| 6,389,372 B1 * | 5/2002 | Glance et al. | 702/189 |
| 6,912,505 B2 * | 6/2005 | Linden et al. | 705/14.53 |
| 7,124,093 B1 * | 10/2006 | Graham et al. | 705/14.41 |
| 7,240,055 B2 * | 7/2007 | Grasso et al. | 707/5 |
| 7,457,768 B2 * | 11/2008 | Horvitz et al. | 705/26 |
| 2001/0047290 A1 * | 11/2001 | Petras et al. | 705/10 |
| 2002/0052873 A1 * | 5/2002 | Delgado et al. | 707/7 |
| 2002/0178057 A1 * | 11/2002 | Bertram et al. | 705/14 |

OTHER PUBLICATIONS

C. Lam, SNACK: Incorporating Social Network Information in Automated Collaborative Filtering, Proceedings of the 5th ACM conference on Electronic commerce, May 17-20, 2004.*

B. Sarwar, G. Karypis, J. Konstan, and J. Riedl, Item-based collaborative filtering recommendation algorithms, In Proceedings of the 10th International WWW Conference, Hong Kong, May 2001.*

J. L. Herlocker, J. A. Konstan, A. Borchers, and J. Riedl, An Algorithmic Framework for Performing Collaborative Filtering, In Proceedings of the 1999 Conference on Research and Development in Information Retrieval, Aug. 1999.*

(Continued)

*Primary Examiner*—Beth V Boswell
*Assistant Examiner*—Tiphany B Dickerson
(74) *Attorney, Agent, or Firm*—Nancy Y. Ru

(57) ABSTRACT

A novel system and method of predicting a user's rating of a new item in a collaborative filtering system is described. The invention incorporates social network information in addition to user ratings to make recommendations. The distance between users in the social network is used to enhance the estimate of user similarities for collaborative filtering. The social network can be constructed explicitly by users or deduced implicitly from observed interaction between users.

6 Claims, 3 Drawing Sheets

OTHER PUBLICATIONS

J. M. Pujol, R. Sanguesa, and J. Delgado, Extracting reputation in multi agent systems by means of social network topology, In Proceedings of the 1st International Joint Conference on Autonomous Agents and Multiagent Systems (AAMAS), 2002.*

* cited by examiner

SYSTEM AND METHOD FOR UTILIZING SOCIAL NETWORKS FOR COLLABORATIVE FILTERING

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The present invention relates generally to systems that create predictions or lists of recommended items for users based on the ratings of other users. In particular, the present invention relates to a collaborative filtering system that utilizes social networks. The predictions can be used by the system to select which items to show to users, or by users to select which items from a list to peruse.

2. Background of the Invention

Automated collaborative filtering (ACF) systems have been developed to predict the preferences of a user on various items, based on known attributes of that user as well as known attributes of other users. These attributes may contain age, gender, and income, as well as one or more of the user's known preferences. For example, a known preference of a user may be his enjoyment of the movie 'Scarface.'

Several automated collaborative filtering engines are currently available. A discussion of such engines can be found, for example, in U.S. Pat. No. 4,870,579 ("System and Method of Predicting Subjective Reactions," 1989) and U.S. Pat. No. 4,996,642 ("System and Method for Recommending Items," 1991), both issued to John B. Hey (employed by LikeMinds Inc.), and Jonathan Herlocker et al., "An Algorithmic Framework for Performing Collaborative Filtering," in Proceedings of the 1999 Conference on Research and Development in Information Retrieval.

In neighbor-based ACF, a user's preference is predicted based on the preferences of other users and weighted by their similarities. Two users' similarity are measured based on the similarity of their attributes. In the conventional approach, a user's preference is predicted using only her k nearest neighbors (that is, the k most similar users). Alternatively, a user's preference can be predicted based on all the neighbors or just those neighbors whose similarities are above a certain threshold.

It should be noted that conventional ACF systems suffer from the new-user and cold-start problems. Both of which lead to inaccuracy in computing the similarity of neighbors in the neighbor-based approach.

A new user to the system may have only provided a small set of her preferences. Thus there is often not sufficient information to truly differentiate between random users versus users who are similar to her. The calculation of the similarity between her and the other users may therefore be inaccurate, and the resulting prediction and recommendation can be erroneous.

The cold-start problem occurs when an ACF system is initially deployed, and most users are new users who have not provided a significant number of their preferences. In this situation, even when a new user is willing to provide many of her preferences, there is still not enough known about the other users to accurately calculate her similarity with those users. Thus the resulting prediction and recommendation can be inaccurate.

Note that model-based ACF systems, such as U.S. Pat. No. 5,704,017 ("Collaborative Filtering Utilizing a Belief Network," 1997) issued to Heckerman et al., differ from neighbor-based ACF systems in that they perform collaborative filtering without calculating the similarity between users. Rather, these model-based systems build a probabilistic model from all users' preferences, and that model is applied to an active user to predict her unstated preferences based on her stated preferences. However, these model-based ACF systems still suffer from the new-user and cold-start problems. Under the new-user problem, the system still does not know enough about a user based just on the small amount of preferences she has given. Model-based ACF systems suffer from the cold-start problem because they cannot build an accurate model based on limited preference data during initial deployment.

U.S. Pat. No. 6,389,372 to Natalie S. Glance and Manfred Dardenne (2002) describes a collaborative filtering technique that bootstraps itself with information about relationships between users in a pre-determined organization. The organizational relationships influence the recommendations only when the users have provided few ratings. As more ratings are gathered, the organizational and network information becomes irrelevant. This is undesirable in many situations, as organizational and network relationships can provide additional information that cannot be derived from ratings alone, and this additional information can improve recommendation.

The invention in U.S. Pat. No. 6,389,372 utilizes an organizational structure that is pre-determined and therefore static. This does not apply to most social networks and organizational structures, which are dynamic. These networks can grow and change. The invention in U.S. Pat. No. 6,389,372 thus fails to provide accurate recommendation once the organization has changed from the pre-determined version used for bootstrapping.

In addition, for the invention in U.S. Pat. No. 6,389,372, the correlation values between users need to be stored for incremental update. For large social networks such memory storage can be prohibitive.

There are many commercial applications of ACF. For example, it has been used for Web advertising and e-commerce (Amazon.com, BarnesandNoble.com, etc.). The commercial value of these ACF applications monotonically increases with the system's accuracy; that is, the more accurate the prediction, the more valuable the system. Thus improving the accuracy of prediction, by incorporating more sources of information, is always desirable, both in the initial deployment and mature operation of the ACF application.

OBJECTS AND ADVANTAGES

Accordingly, several objects and advantages of the present invention are:

(a) to provide a collaborative filtering system which does not suffer from the new-user problem;

(b) to provide a collaborative filtering system which does not suffer from the cold-start problem;

(c) to provide a collaborative filtering system which can give more accurate recommendations by persistently incorporating social network information;

(d) to provide a collaborative filtering system which can utilize a dynamically changing social network; and (e) to provide a collaborative filtering system which does not require the storage of correlation values for incremental update.

Further objects and advantages will become apparent from a consideration of the ensuing description and drawings.

SUMMARY OF THE INVENTION

This invention is an improved collaborative filtering system. It incorporates social network information about users, in addition to users' ratings on items, to improve recommendation of items. The social network can be dynamic and need not be pre-determined to initialize the system.

DETAILED DESCRIPTION OF A PREFERRED EMBODIMENT

Introduction to Social Networks

Figure 1:
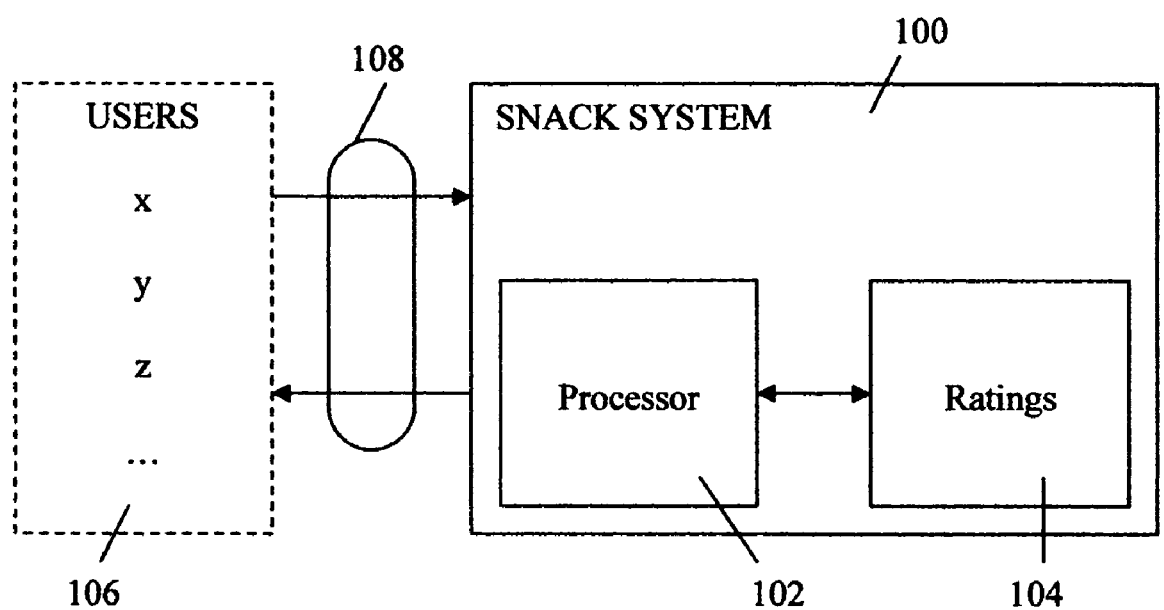
FIG. 1 is a block diagram of a collaborative filtering system according to the invention.

Social network is a network graph of relationships between people. One can collect networks of friendship and encode these networks in digital form. Companies such as Friendster, LinkedIn, Spoke Software, and Tribe.net are digitizing different social networks with the goal of helping members meet and introduce each other. Some e-commerce Web sites have features that encourages one to state who her friends are. These features include notifying friends for social events (e.g., Evite), sending interesting documents to acquaintances (e.g., Wall Street Journal Online, New York Times online), and forwarding promotional discounts (e.g., Amazon). The collection of these relationships form social networks. Many Internet-based collaboration tools, such as Groove Network and Plaxo, also capture social networks.

In addition to explicit social connections, social networks can also be constructed out of implicit social connections. For example, two persons can be considered connected if they work in the same corporate department. That is, the social network is constructed without people explicitly stating their social connections.

Sociologists have examined social networks and devised many metrics to measure different properties. One of the metrics is degree of separation. For a given person, her direct acquaintances have one degree of separation from her. The acquaintances of her acquaintances, except for those who are one degree separated from her, have two degrees of separation from her. Higher degrees of separation are defined analogously.

One of the main findings from social network research is that people tend to share similar preferences with others with low degrees of separation. For example, one tends to enjoy similar music as her friends, and also with her friends' friends, but to a lesser degree. We leverage this principle to use social networks for collaborative filtering.

Preferred Embodiment

There exists a set of ratings $r_{u,j}$ corresponding to user u's rating for item j. Let $I_u$ be the set of items that user u has rated. The average rating for user u is $$\bar{r}_u = \frac{1}{|I_u|} \sum_{j \in I_u} r_{u,j}.$$

There exists an active user, denoted by subscript a. The goal is to predict the active user's preference for an item i, or $p_{a,i}$. The prediction is done using the formula, $$p_{a,i} = \bar{r}_a + \frac{\sum_u w''_{a,u}(r_{u,i} - \bar{r}_u)}{\sum_u |w''_{a,u}|},$$

where the summation over u is over the set of non-active users who have rated item i, and $w''_{a,u}$ is the similarity (also known as weight or correlation) between the active user a and the neighbor u. To define this similarity we first define $w_{a,u}$, which is the Pearson correlation coefficient, $$w_{a,u} = \frac{\sum_i (r_{a,i} - \bar{r}_a)(r_{u,i} - \bar{r}_u)}{\sqrt{\sum_i (r_{a,i} - \bar{r}_a)^2} \sqrt{\sum_i (r_{u,i} - \bar{r}_u)^2}}.$$

The summations over the set i are over the set of items that both user a and user u have rated. The Pearson correlation tries to measure the weight between the two users using just rated items alone. Unfortunately, this correlation can be artificially high between users who have only few rated items in common. To mitigate this effect, a significance weighting is used. That is, we let $w'_{a,u} = w_{a,u}$ if there are more than N co-rated items. Otherwise, $w'_{a,u}$ is equal to $w_{a,u}$ times the number of co-rated items between the two users divided by N, or $$w'_{a,u} = w_{a,u} \frac{|I_a \cap I_u|}{N}.$$

Finally, the similarity $w''_{a,u}$ is defined as $$w''_{a,u} \eta^{d_{a,u}} + (1 - \eta^{d_{a,u}}) w'_{a,u}$$

The idea is to start from the weight $w'_{a,u}$ and boost it for users with close relationship to the active user. The amount of boost is determined by two factors. The tunable parameter $\eta \leq 1$ controls the level of emphasis given to close friends, and the function $d_{a,u}$ is a measure of distance between active user a and user u in the social network. When $\eta$ is zero, the system ignores network information. Conversely, when $\eta$ is one, the system treats everyone as friends and all have uniform emphasis. The distance $d_{a,u}$ is the length of the shortest path between the two users in the social network. This distance is also called the degree of separation. Note that when users a and u are the same person, $d_{a,u} = 0$ and $w'_{a,u} = 1$. For the other boundary case, when users a and u are completely disconnected, the distance $d_{a,u}$ is infinite and $w'_{a,u} = w_{a,u}$.

Referring now to the drawings, and in particular to FIG. 1, a collaborative filtering system in accordance with the invention is generally shown and indicated by reference numeral 100. The collaborative filtering system 100 includes processor 102 and ratings 104 stored in memory. The processor 102 performs various calculations to provide recommendations to users 106 via interface 108. Interface 108 may be an Intranet, the Internet, or other communication networks.

Figure 2:
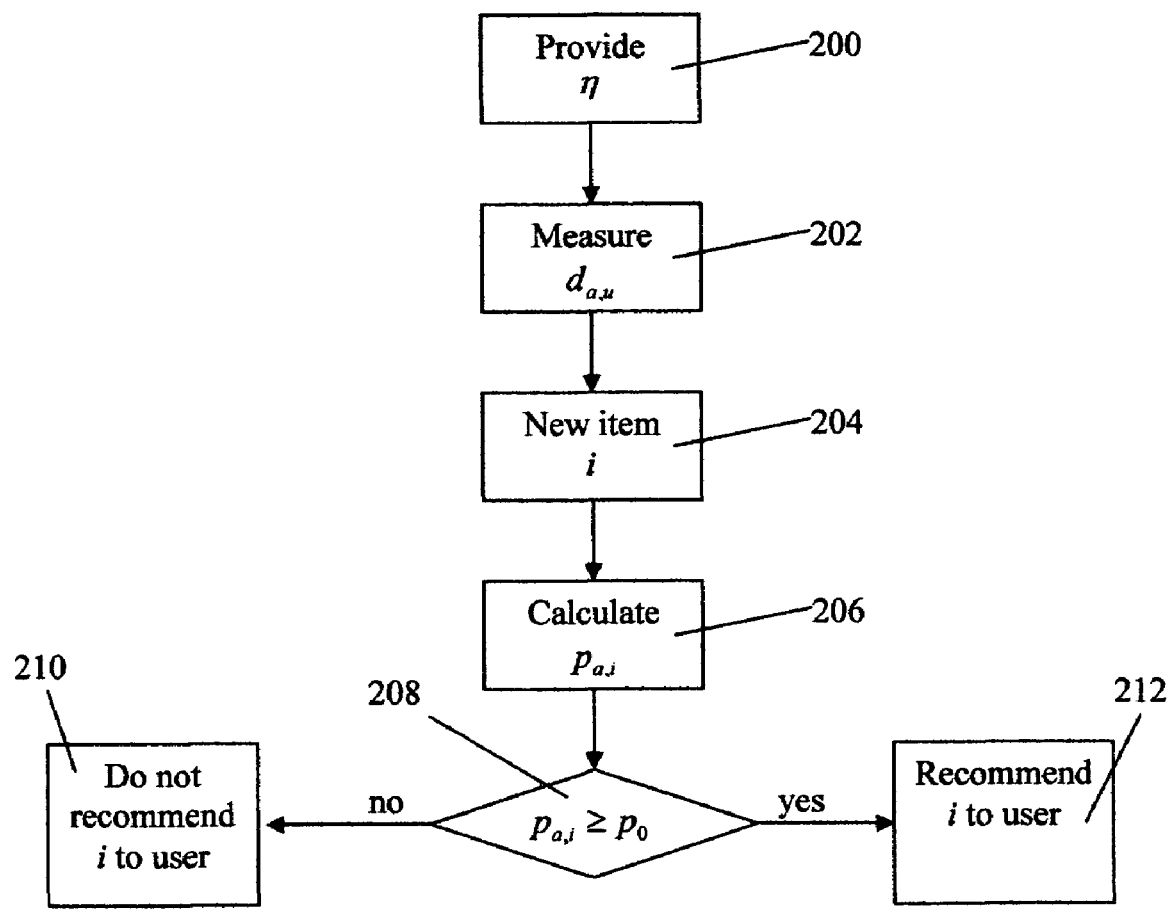
FIG. 2 is a flow chart of a method, according to the invention, of predicting a user's rating of a new item.

Referring to FIG. 2, a flow chart of the steps in making a recommendation using a collaborative filtering system is shown. In step 200, the parameter η is provided. In step 202, the distances between users $d_{a,u}$, as described above, are measured. In step 204, a new item i is provided. In step 206, a prediction of how the active user a will rate item i is made. In step 208, if the rating is equal to or greater than a threshold value $p_0$, then the recommender system makes a recommendation to the active user a in step 212. If not, the recommender system does not make a recommendation in step 210.

Figure 3:
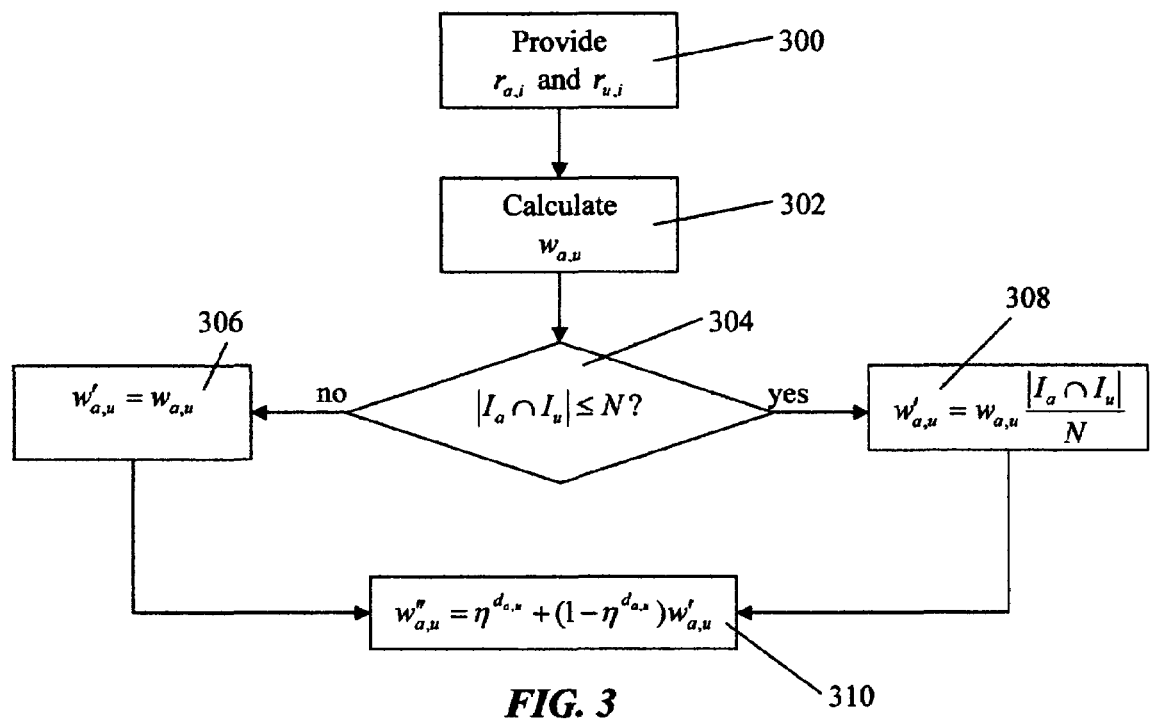
FIG. 3 is a flow chart of a method, according to the invention, of calculating the similarity between two users taking into account their social network.

Referring to FIG. 3, a flow chart of the steps in calculating the similarity between two users, taking into account their social network, is shown. In step 300, the ratings of the two users, a and u, are provided. The Pearson correlation coefficient $w_{a,u}$ is calculated in step 302. In step 304, if the number of co-rated items $|I_a \cap I_u|$ is equal to or less than a threshold value N, then $w'_{a,u}$ is calculated according to step 308, which sets $$w'_{a,u} = \frac{w_{a,u}}{|I_a \cap I_u|}.$$

If not, $w'_{a,u}$ is calculated according to step 306, which sets $w'_{a,u} = w_{a,u}$. Finally in step 310, the similarity $w''_{a,u}$ is set to $\eta^{d_{a,u}} + (1-\eta^{d_{a,u}})w'_{a,u}$.

Alternative Embodiments

In an alternative embodiment of the present invention, only a subset of most similar users is used for prediction. That is, in the prediction equation, $$p_{a,i} = \bar{r}_a + \frac{\sum_u w''_{a,u}(r_{u,i} - \bar{r}_u)}{\sum_u |w''_{a,u}|}.$$

the summation u is over only a subset of non-active users who have rated item i. This subset can be a fixed size set of users most similar to user a according to $w''_{a,u}$. Alternatively, this subset can be all users whose similarities to user a (i.e., $w''_{a,u}$) are above a certain threshold.

In alternative embodiments of the present invention, the weight $w_{a,u}$ can be other measures of similarity between two users. For example, the Spearman rank correlation coefficient can replace the Pearson correlation coefficient for $w_{a,u}$. The Spearman rank correlation coefficient is defined similarly to the Pearson correlation coefficient but uses items' rankings rather than their ratings. In another alternative embodiment, vector similarity can be used for $w_{a,u}$. That is, $$w_{a,u} = \sum_i \frac{r_{a,i} r_{u,i}}{\sqrt{\sum_{j \in I_a} r_{a,j}^2} \sqrt{\sum_{j \in I_u} r_{u,j}^2}},$$

where $I_a$ and $I_u$ are the set of items user a and user u have rated, respectively.

In another alternative embodiment, the ratings are binary. That is, a user has either not rated an item or she has approved of it by taking action on it in some form. The active user's rating of item i (i.e., $r_{a,i}$) is 0 if she has not rated it or 1 if she has approved of it. For binary ratings, all the weighting schemes described previously can be used. In addition, the weight $w_{a,u}$ can be the Jaccard distance between the ratings from the two users. That is, $$w_{a,u} = \frac{|I_a \cap I_u|}{|I_a \cup I_u|}.$$

In another alternative embodiment, the weight $w_{a,u}$ can be set to a constant, such as zero. The recommendations will thus be based solely on the social network.

In alternative embodiments of the present invention, the distance $d_{a,u}$ can be other well-known measures of distance on a network, as studied in graph theory, topology, or social network analysis. For example, the distance $d_{a,u}$ can be the hitting time between a and u, which is defined as the expected number of steps required for a random walk starting at a to reach u.

In an alternative embodiment of the present invention, other forms of significance weighting are used.

Applications of the Preferred Collaborative Filtering System

The preferred collaborative filtering system is not limited in its applicability. The preferred collaborative filtering system has many applications of which only a few are described below.

In one sample application, a retailer can recommend products, such as music CDs, DVDs, movies, wines, restaurants, and books, to a user based on that user's social network and purchasing history.

In another application, a Web site can recommend social events, such as music concerts.

In another application, a Web site can show documents or advertisements to a user based on that user's social network and her click-through profile. For example, an online advertisement that has been clicked on by a user will more likely be shown to that user's friends.

In another application, a digital video recorder can record shows for a user based on that user's social network and her recording profile.

One skilled in the art will appreciate that the above-described applications can be practiced either individually or in any combination by the preferred embodiment.

While the present invention has been described with reference to a preferred embodiment thereof, those skilled in the art will know of various changes in form that may be made without departing from the spirit and scope of the claimed invention as defined in the appended claims.

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microprocessor systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A computer-implemented method of predicting an active user's rating for an item in a recommendation system implemented on computing equipment, wherein the active user and a plurality of non-active users are members of a social network implemented on computing equipment, comprising:

providing a similarity measure, $w''_{a,u}$ for each pair of users in said recommendation system;

determining ratings for items rated by non-active users in said recommendation system;

calculating, with the similarity measure $w''_{a,u}$, by the processor, a weighted average of ratings for said item to produce the predicted active user's rating;

wherein the similarity measure, $w''_{a,u}$ comprises a relationship distance in said social network between pairs of users, wherein an initial version of the similarity measure $w_{a,u}$ for active user a and non-active user u in the system comprises the relationship $$w_{a,u} = \frac{\sum_i (r_{a,i} - \bar{r}_a)(r_{u,i} - \bar{r}_u)}{\sqrt{\sum_i (r_{a,i} - \bar{r}_a)^2} \sqrt{\sum_i (r_{u,i} - \bar{r}_u)^2}}$$

where $r_{u,i}$ is the rating of non-active user u who has rated item i, $r_{a,i}$ is the rating of active user, a, who has rated item i, wherein calculating a second version of the similarity measure, $w'_{a,u}$ for active user a and neighbor user u in the system comprises enhancing the initial version correlation coefficient $w''_{a,u}$ in accordance with the relationship:

$w'_{a,u} = w'_{a,u}$, if there are more than N co-rated items $$w'_{a,u} = w_{a,u} \frac{|I_a \cap I_u|}{N},$$

otherwise where $I_u$ is the set of items that neighbor user u has rated, $I_a$ is the set of items that active user a has rated, wherein the similarity measure $w''_{a,u}$ is enhanced from the second version $w'_{a,u}$ of the similarity measure in accordance with the relationship $w''_{a,u} \eta^{d_{a,u}} + (1 - \eta^{d_{a,u}}) w'_{a,u}$ where $\eta$ is a tunable parameter and $d_{a,u}$ is a measure of relationship distance between active user a and non-active user u in the social network.

2. The computer-implemented method of claim 1, wherein the social network implemented on computing equipment is a network graph of relationships between users, wherein the social network is constructed out of social relationships, wherein degrees of separation between users within the social network is a primary metric of distance between users of the network, wherein a neighbor user is a non-active user that is close in distance to the active user, and wherein the similarity measure $w''_{a,u}$ is calculated using only those non-active users that are neighbor users.

3. The computer-implemented method of claim 2, wherein the predicted user rating of said item i for an active user a is calculated in accordance with the relationship:

$$\bar{r}_a + \frac{\sum_u w''_{a,u}(r_{u,i} - \bar{r}_u)}{\sum_u |w''_{a,u}|},$$

where the summation over u is over a set of non-active users who have rated item i, where $r_{u,i}$ is a rating of neighbor user u who has rated item i, $w''_{a,u}$ is the similarity measure between the active user a and the neighbor u, and $\bar{r}_a$ is an average rating for active user a.

4. A collaborative filtering system for predicting a user's rating for an item, wherein the user and a plurality of other users are members of a social network, comprising:

a memory storing:

a similarity measure $w''_{a,u}$ for each pair of users in said recommendation system;

ratings for items rated by other users in said recommendation system;

a processor for calculating a weighted average of all the ratings for the item, wherein the weighted average is the sum of the product of a rating and its respective correlation coefficient similarity measure divided by the sum of the correlation coefficients similarity measures to provide a predicted user rating;

wherein the similarity measure comprises a measure of similarity in ratings between pairs of users;

wherein the similarity measure comprises a relationship distance in the said social network between pairs of users;

wherein the processor calculates an initial version of the correlation coefficient $w_{a,u}$ for user a and other user u in the system in accordance with the relationship $$w_{a,u} = \sum_i \frac{r_{a,i} r_{u,i}}{\sqrt{\sum_{j \in I_a} r_{a,j}^2} \sqrt{\sum_{j \in I_u} r_{u,j}^2}}$$

where $r_{u,i}$ is the rating of other user u who has rated item I, $r_{a,i}$ is the rating of user a who has rated item I, where $I_a$ and $I_u$ are the set of items user a and user u have rated, respectively, wherein the processor enhances the initial version of coefficient $w_{a,u}$ by calculating the second version of the correlation coefficient, $w'_{a,u}$ for user a and other user u in the system in accordance with the relationship:

$w'_{a,u} = w_{a,u}$, if there are more than N co-rated items $$w'_{a,u} = w_{a,u} \frac{|I_a \cap I_u|}{N},$$

otherwise
where $I_u$ is the set of items that other user u has rated, $I_a$ is the set of items that active user a has rated, wherein the processor calculates the similarity measure $w''_{a,u}$ by enhancing a second version $w'_{a,u}$ of the similarity measure in accordance with the relationship $$w''_{a,u} = \eta^{d_{a,u}} + (1-\eta^{d_{a,u}})w''_{a,u}$$

where $\eta$ is a tunable parameter and $d_{a,u}$ is a measure of relationship distance between user a and other user u in the social network.

5. The system of claim 4, wherein the social network is a network graph of relationships between people, wherein the social network is constructed out of social relationships, wherein the degrees of separation between people within the social network is a primary metric of distance between nodes of the network.

6. The system of claim 4, wherein the processor calculates the predicted user rating of an item i for a user a in accordance with the relationship:

$$\bar{r}_a + \frac{\sum_u w''_{a,u}(r_{u,i} - \bar{r}_u)}{\sum_u |w''_{a,u}|},$$

where the summation u is over a subset of other users that are most similar to user a according to $w'_{a,u}$ and who have rated i, where $r_{u,i}$ is the rating of other user u who has rated item i, $w'_{a,u}$ is the similarity measure between user a and the other user u, and $\bar{r}_a$ is an average rating for active user a.

* * * * *